(12) United States Patent
Kim

(10) Patent No.: US 6,836,303 B2
(45) Date of Patent: Dec. 28, 2004

(54) LIGHT GUIDE PLATE HAVING VISUAL ANGLE ADJUSTING MEMBER AND LIQUID CRYSTAL DISPLAY APPARATUS HAVING THE SAME

(75) Inventor: Man Soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/280,347

(22) Filed: Oct. 25, 2002

(65) Prior Publication Data

US 2003/0137618 A1 Jul. 24, 2003

(30) Foreign Application Priority Data

Jan. 18, 2002 (KR) .......................................... 2002-3079

(51) Int. Cl.$^7$ ............................................ G02F 1/1335
(52) U.S. Cl. .......................................... 349/65; 362/31
(58) Field of Search ........................ 349/64, 65; 362/31

(56) References Cited

U.S. PATENT DOCUMENTS 4,043,636 A * 8/1977 Eberhardt et al. ............ 349/65
4,811,507 A * 3/1989 Blanchet ........................ 40/546
5,394,308 A * 2/1995 Watanabe et al. ............. 362/31
5,961,198 A * 10/1999 Hira et al. ..................... 362/31
6,700,632 B2 * 3/2004 Taniguchi et al. ............ 349/65

* cited by examiner

*Primary Examiner*—Robert H. Kim
*Assistant Examiner*—Andrew Schechter
(74) *Attorney, Agent, or Firm*—Cantor Colburn LLP

(57) ABSTRACT

Disclosed is a light guide plate for improving front visual angle characteristics. Either a pyramidal recession having at least three sidewalls and a predetermined depth or a pyramidal protrusion having at least three sidewalls and a predetermined height is formed on a light emitting surface of the light guide plate. Accordingly, it is possible to increase the brightness of the front visual angle without using a prism and diffusion sheets or with a reduced number of prism sheets. Also, an LCD apparatus using the light guide plate has a reduced weight and volume compared with conventional LCDs.

32 Claims, 20 Drawing Sheets

LIGHT GUIDE PLATE HAVING VISUAL ANGLE ADJUSTING MEMBER AND LIQUID CRYSTAL DISPLAY APPARATUS HAVING THE SAME

BACKGROUND OF THE INVENTION

1. Field of the Invention

The present invention relates to a liquid crystal display (LCD) apparatus, and more particularly to a light guide plate for improving a front visual angle characteristic and an LCD apparatus having the same.

2. Description of the Related Art

In general, an LCD apparatus has an advantage over a CRT type display apparatus in aspects of weight and size. The advantage of the LCD can be realized by using a liquid crystal. The liquid crystal is controlled by an electric field. The liquid crystal is arranged in a predetermined direction parallel to a direction of the electric field, and a light transmittance varies depending on the arrangement of the liquid crystal.

The LCD apparatus requires a light to display an image through the liquid crystal. That is, since display properties are varied depending on a uniformity of a light provided to the liquid crystal, the light having a uniform brightness has to be provided to the liquid crystal.

However, it is difficult to provide a surface light source having the uniform brightness to the liquid crystal. Thus, a lamp 10 having a linear light source or a light emitting diode (LED) having a point light source are used as a device that provides the light as shown in FIG. 1.

FIG. 1 is a schematic view showing an LCD panel of a conventional LCD apparatus. FIG. 2 is a graph showing a distribution of brightness in accordance with a visual angle in the LCD apparatus shown in FIG. 1.

Referring to FIG. 1, the light having the linear light source or the point light source is incident to a light guide plate 20, and then the light guide plate 20 converts the light having the linear or point light sources into a light having the surface light source.

After converting the linear light source into the surface light source by the light guide plate 20, the light is emitted through a light emitting surface of the light guide plate 20. However, since a refractive index of the light guide plate 20 is greater than that of an air, the light having the surface light source is emitted in a direction inclined, about 75 to 83 degrees, with respect to a direction perpendicular to a light emitting surface of the light guide plate 20. This means that the brightness of the front visual angle of the LCD having the light guide plate 20 is lowered, so that a quality of the displayed image is not desirable.

To prevent the brightness from being lowered, a diffusion sheet 30, a first prism sheet 43, a second prism sheet 46 are sequentially disposed on the light guide plate 20. The diffusion sheet 30, the first prism sheet 43 and the second prism sheet 46 change the direction of the light inclined with respect to a normal line to the light emitting surface into a direction perpendicular to the light emitting surface of the light guide plate 20.

The LCD apparatus further includes a reflecting plate 15 under the light guide plate 20, a protecting sheet 50 on the second prism sheet 46 and LCD panel 60 that controls the liquid crystal.

Referring to FIG. 2, a graph indicated by a character "a" shows the brightness distribution of the light emitted through the light guide plate 20, a graph indicated by a character "b" shows the brightness distribution of the light sequentially emitted through the light guide plate 20 and the diffusion sheet 30, and a graph indicated by a character "c" shows the brightness distribution of the light sequentially emitted through the light guide plate 20, the diffusion sheet 30 and the first and second prism sheets 43 and 46.

With reference to the graph "a", in case of the light through the light guide plate 20, the brightness of the front visual angle is low and the brightness of the visual angle of about 70 to 80 degrees is maximized. The light emitted from the diffusion sheet 30 has the brightness of the front visual angle generally greater than that of the light emitted from the light guide plate 20, as indicated by the character "b". The light emitted from the first and second prism sheets 43 and 46 has the highest brightness of the front visual angle as indicated by the character "c". The light of which the direction thereof is corrected by the diffusion sheet 30, the first prism sheet 43 and the second prism sheet 46 is provided to the LCD panel, thereby displaying the image having a uniform brightness in general.

However, since the LCD apparatus adopts some sheets such as the diffusion sheet 30, the first and second sheets 43 and 46 and so on, the thickness and the weight of the LCD apparatus are increased. Also, the manufacturing cost of the LCD apparatus increases by adopting the diffusion sheet 30, the first and second sheets 43 and 46 and the like.

BRIEF SUMMARY OF THE INVENTION

The present invention provides a light guide plate for improving a front visual angle characteristic.

The present invention provides an LCD apparatus having a reduced number of optical sheets.

The present invention provides an LCD apparatus without an optical sheet.

In one aspect of the invention, there is provided a light guide plate comprising: a side portion for receiving light; a light reflecting portion for reflecting the light input through the side portion; and a light emitting portion facing the light reflecting portion, for emitting the light reflected by the light reflecting portion, wherein the light emitting portion has a visual angle correcting means for increasing a brightness of the light emitted through the light emitting portion at a front visual angle.

In another aspect, there is provided an LCD apparatus comprising: an LCD panel assembly for controlling a liquid crystal to display an image; and a backlight assembly having a lamp assembly for supplying a light and a light guide plate for guiding the light from the lamp assembly to the LCD panel assembly, wherein the light guide plate comprises a side portion for receiving the light, a light reflecting portion for reflecting the light input through the side portion, and a light emitting portion facing he light reflecting portion, for emitting the light reflected by the light reflecting portion, the light emitting portion includes a visual angle correcting means for increasing a brightness of the light emitted through the light emitting portion at a front visual angle.

In further aspect, there is provided an LCD apparatus comprising: an LCD panel assembly for controlling a liquid crystal to display an image; and a backlight assembly having a lamp assembly for supplying a light, a light guide plate for guiding the light from the lamp assembly to the LCD panel assembly and a prism sheet disposed between the LCD panel assembly and the light guide plate, wherein the light guide plate comprises a side portion for receiving the light, a light reflecting portion for reflecting the light input through the side portion, and a light emitting portion facing the light reflecting portion, for emitting the light reflected by the light reflecting portion, and the light emitting portion includes a visual angle correcting means for increasing a brightness of the light emitted through the light emitting portion a front visual angle.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE PREFERRED EMBODIMENTS

Figure 1:
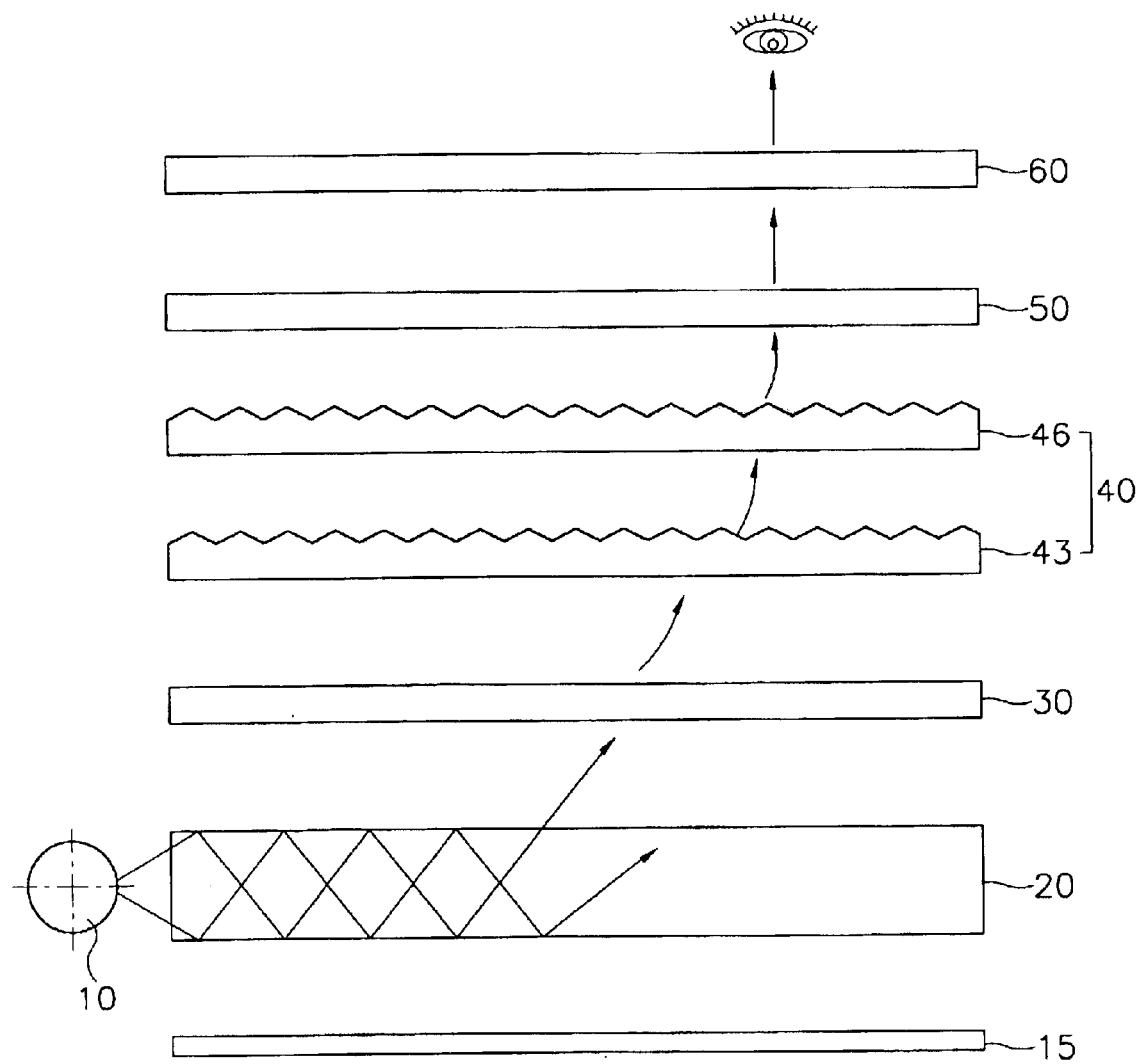
FIG. 1 is a schematic view showing an LCD panel of a conventional LCD apparatus.
Figure 2:
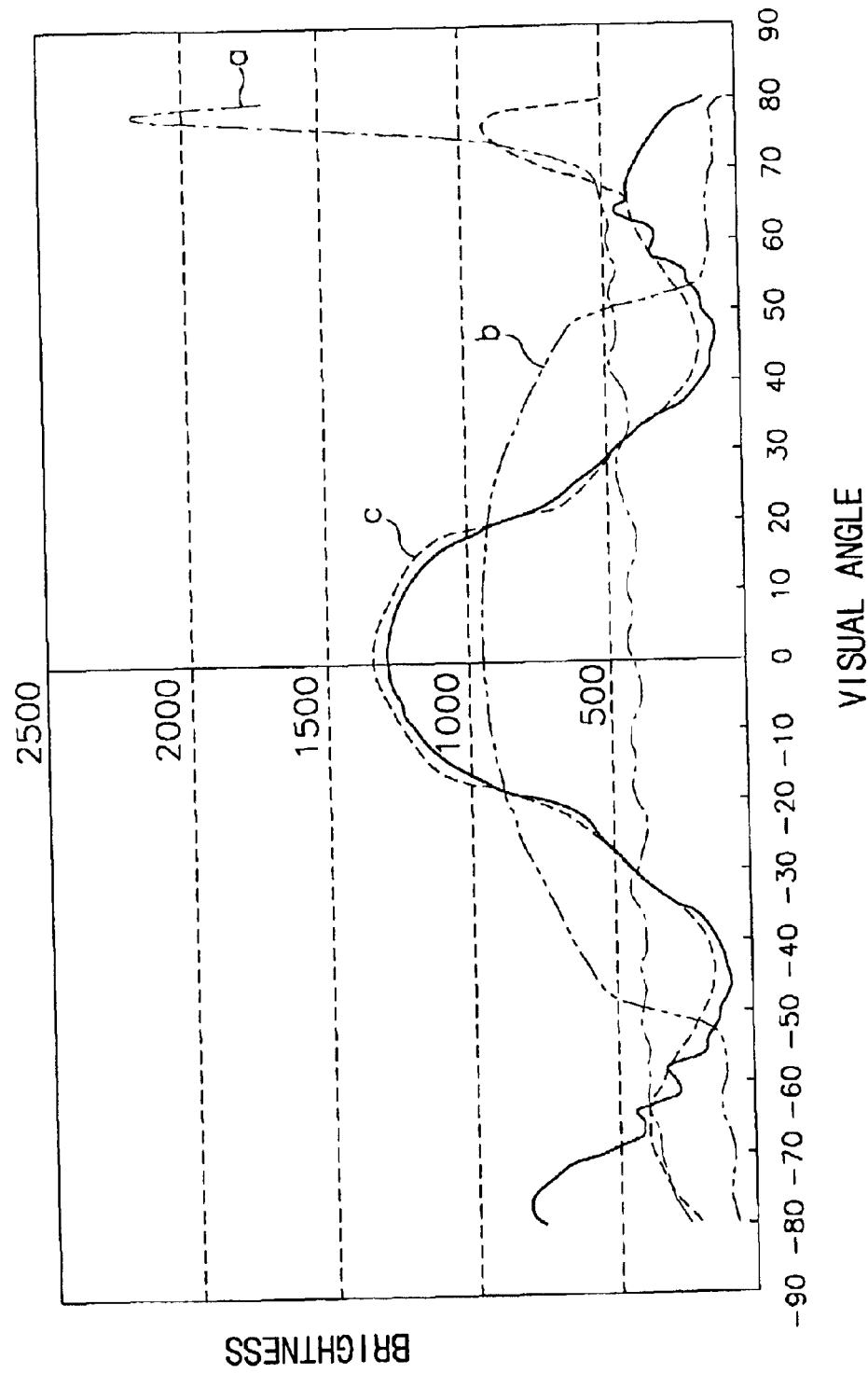
FIG. 2 is a graph showing a distribution of brightness in accordance with a visual angle in the LCD apparatus shown in FIG. 1.
Figure 3:
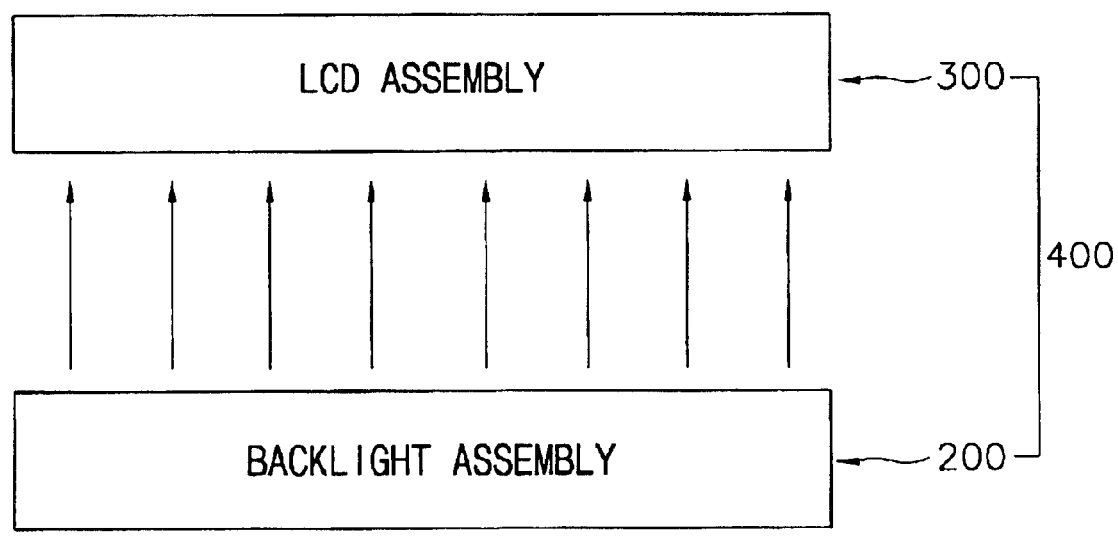
FIG. 3 is a schematic view showing a sheetless LCD apparatus according to one example of the present invention.
Figure 4:
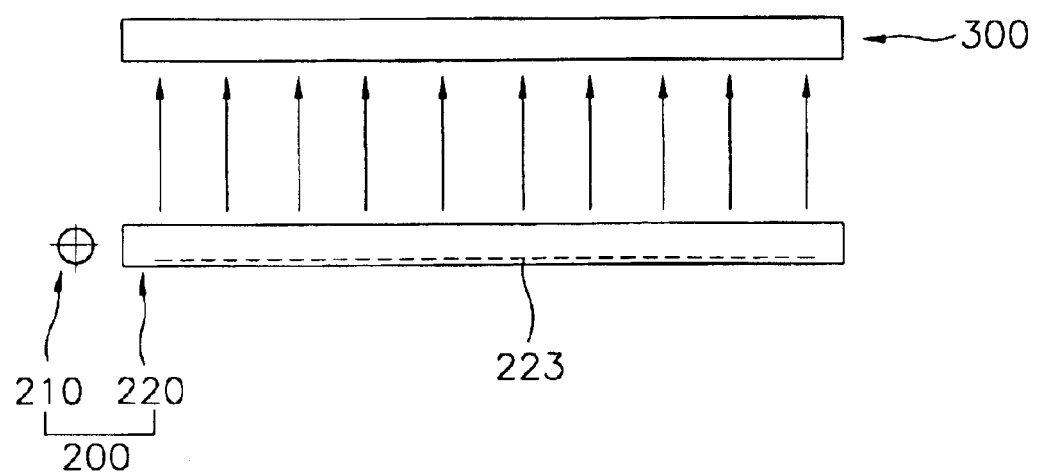
FIG. 4 is a schematic view showing a backlight assembly of the sheetless LCD apparatus shown in FIG. 3.

FIG. 3 is a schematic view showing a sheetless LCD apparatus according to one example of the present invention and FIG. 4 is a schematic view showing a backlight assembly of the sheetless LCD apparatus shown in FIG. 3.

Referring to FIG. 3, the LCD apparatus 400 includes an LCD panel assembly 300 for precisely controlling a liquid crystal to display an image and a backlight assembly 200 for providing a light to the LCD assembly 300.

Referring to FIG. 4, the backlight assembly 200 includes a lamp 210 and a light guide plate 220. The lamp 210 generates the light having a light flux of a linear light source using a cold cathode fluorescent lamp (CCFL). The lamp 210 may further include a lamp reflector (not shown) that reflects the light emitted from the lamp 210 to the light guide plate 220.

In the LCD apparatus 400, there are no optical sheets and prism sheets between the light guide plate 220 and the LCD panel assembly 300. The LCD apparatus 400 is defined as a sheetless LCD apparatus.

Figure 5:
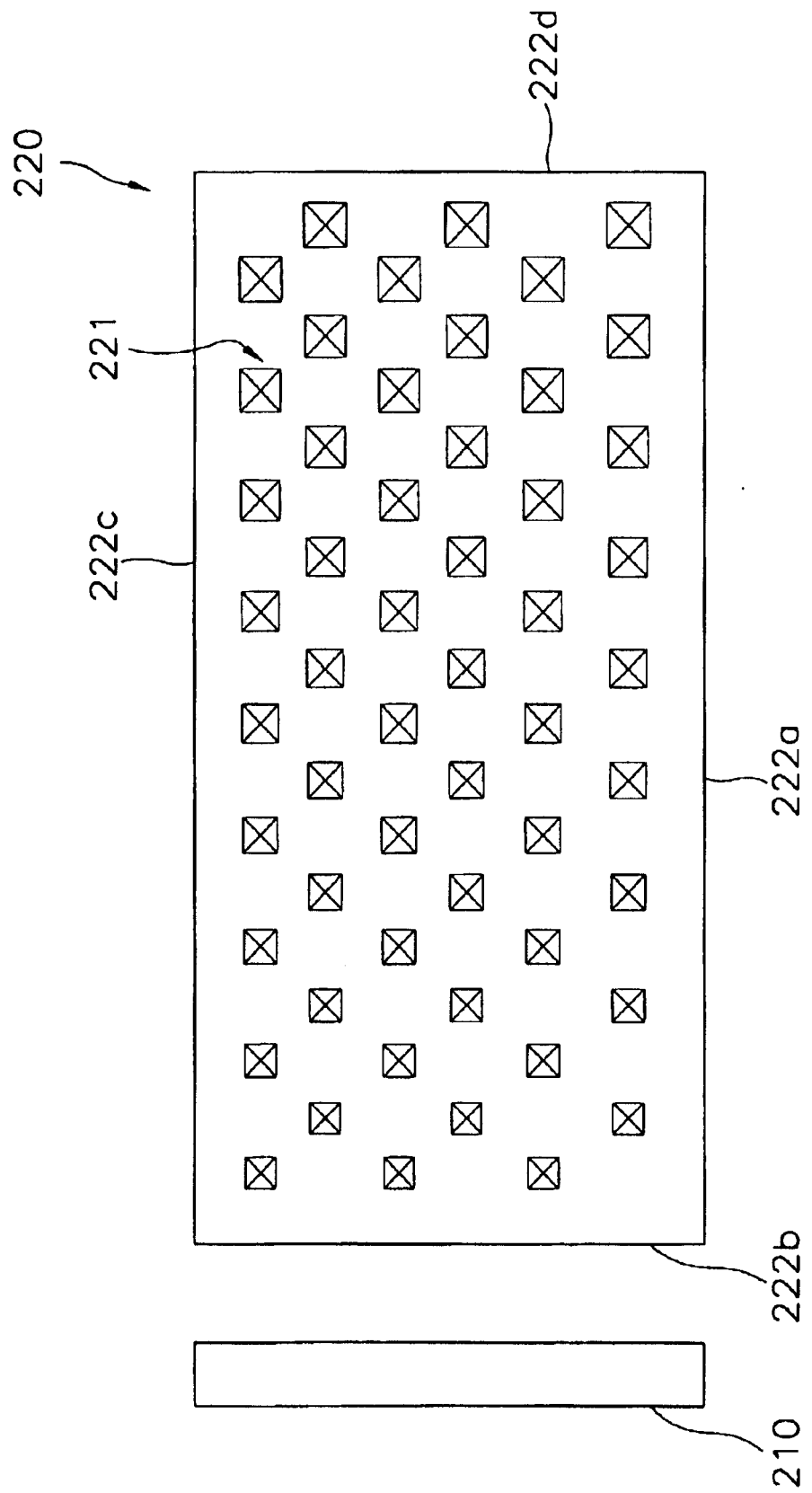
FIG. 5 is a plan view showing a light guide plate according to one example the present invention.
Figure 6:
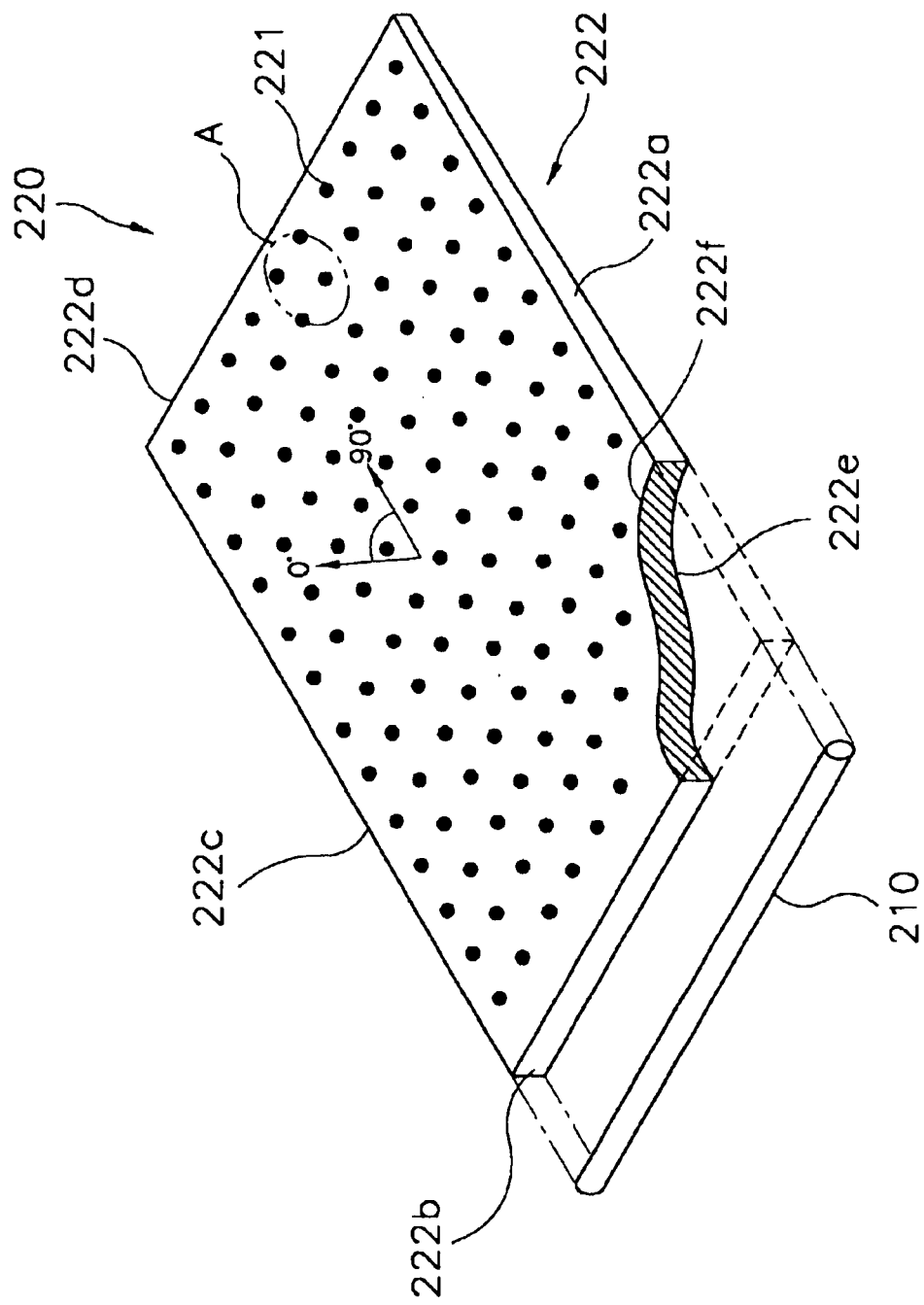
FIG. 6 is a partially cut perspective view showing the light guide plate according to one example of the present invention.
Figure 7:
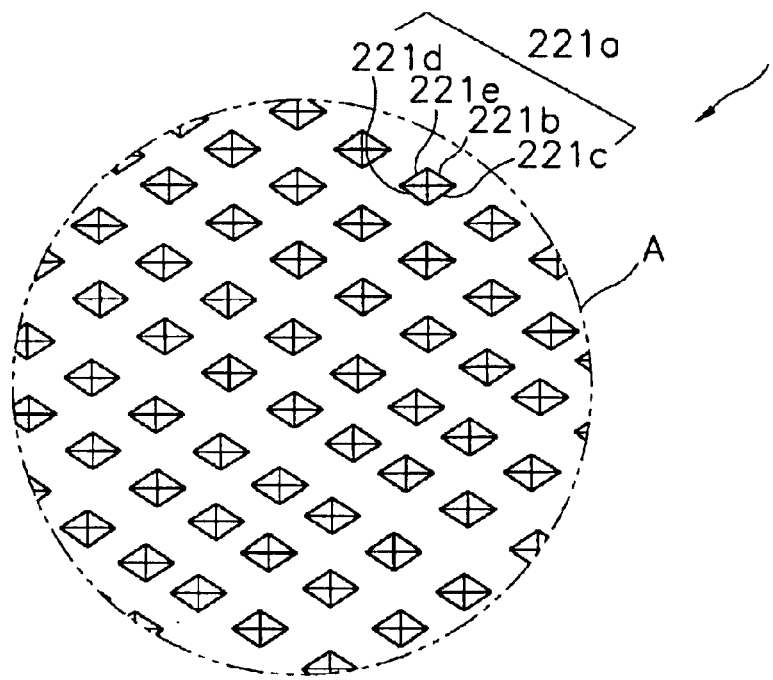
FIG. 7 is a perspective view showing a visual angle correcting recession formed on a light emitting surface of the light guide plate shown in FIG. 6.

FIG. 5 is a plane view showing a light guide plate according to one example of the present invention, FIG. 6 is a partially cut perspective view showing the light guide plate and FIG. 7 is a perspective view showing a visual angle correcting recession formed on a light emitting surface of the light guide plate shown in FIG. 6.

As shown in FIG. 5, the sheetless LCD apparatus 400 employs the light guide plate 220 on which a visual angle correcting portion 221 is formed.

Referring to FIG. 6, the light guide plate 220 includes a light guide body 222 having a wedge shape and the visual angle correcting portion 221. The light guide body 222 includes four side surfaces 222a, 222b, 222c and 222d, a light reflecting surface 222e and a light emitting surface 222f facing the light reflecting surface 222e. The light reflecting surface 222e and the light emitting surface 222f are connected by the four side surfaces 222a, 222b, 222c and 222d.

The lamp 210 is disposed adjacent to one surface that receives the light from the lamp 210 among the four side surfaces 222a, 222b, 222c and 222d. The CCFL is used as the lamp 210 that provides the light having a light flux of a linear light source.

The light input through the four side surfaces 222a, 222b, 222c and 222d of the light guide body 222 is changed to have a light flux of a surface light source. The light having the light flux of the surface light source is emitted out of the light guide body 222 through the light emitting surface 222f. On the light reflecting surface 222e facing the light emitting surface 222f, reflecting dots 223 are formed and the reflecting dots 223 scatter the light to be emitted out of the light guide body 222. The reflecting dots comprises a light scattering material and arranged in a matrix form. A surface area of reflecting member (reflecting dot 223) is proportional to a distance between the light incident side surface of the light guide plate and the reflecting member.

Also, at least one visual angle correcting portion 221 is formed on the light emitting surface 222f. The visual angle correcting portion 221 changes a light path of the light emitted through the light emitting surface 222f, so that the light emitted through the light emitting surface 222f advances in a direction substantially perpendicular to the LCD panel assembly 300.

Referring to FIGS. 6 and 7, the visual angle correcting portion 221 includes a plurality of visual angle correcting recessions 221a formed on the light emitting surface 222f. The visual angle correcting recession 221a is recessed from the light emitting surface 222f to have a predetermined depth "h". Thus, the visual angle correcting recession 221a has the depth "h". The depth can be varied from about 0.2 mm to about 0.5 mm. In one embodiment, the depth is about 0.3 mm to about 0.5 mm. A volume of the visual angle correcting recession 221a is inversely proportional to the depth of the visual angle correcting recession 221a. Namely, the visual angle correcting recession 221a can be any shape satisfying the condition that the volume of the visual angle correcting recession 221a decreases according as the predetermined depth "h" increases. For example, the visual angle correcting recession 221a has a pyramid shape having at least three sidewalls. The sidewalls have an equilateral triangle shape or an isosceles triangle shape.

Figure 8A:
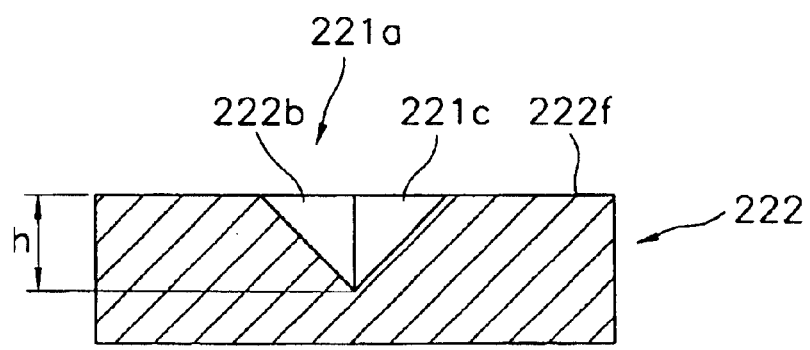
FIGS. 8A and 8B are cross-sectional views showing a structure of the visual angle correcting recession shown in FIG. 7.
Figure 8B:
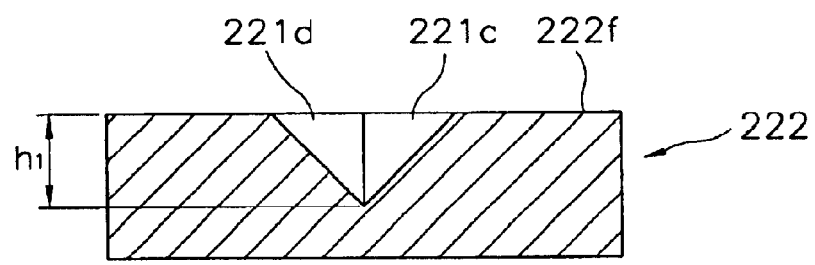

In one embodiment, the visual angle correcting recession 221a is formed in a quadrangular pyramid shape having four sidewalls 221b, 221c, 221d and 221e as shown in FIGS. 7, 8A and 8B.

The visual angle correcting recession 221a is arranged in a matrix form. The visual angle correcting recession 221a has a volume proportional to a distance between the light incident side surface 222b and the visual angle correcting recession 221a.

Figure 9:
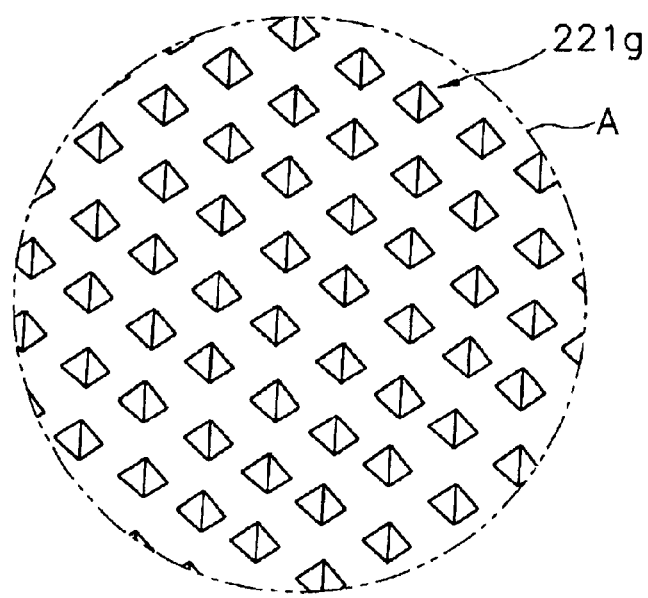
FIG. 9 is a perspective view showing a visual angle correcting protrusion formed on a light emitting surface of the light guide plate shown in FIG. 6.
Figure 10:
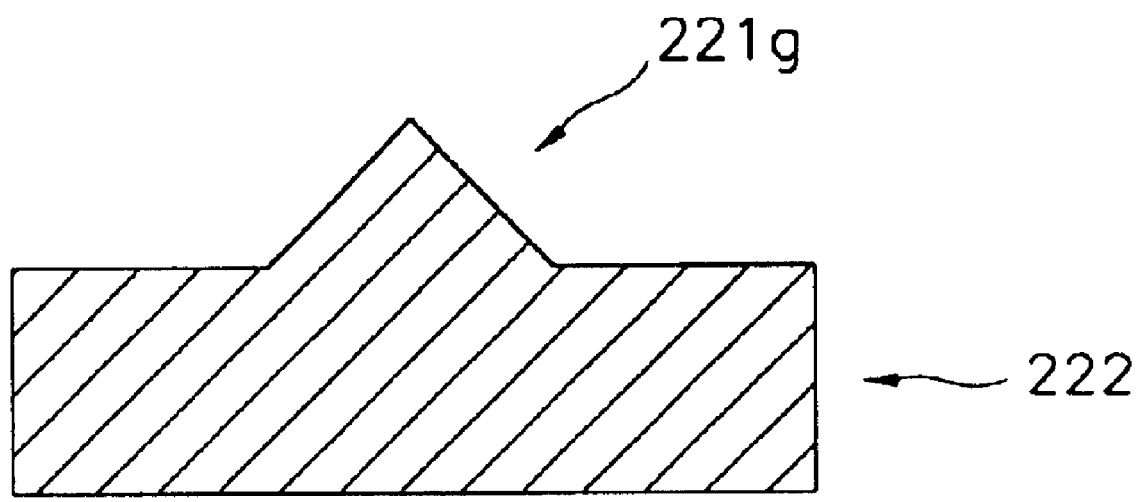
FIG. 10 is a cross-sectional view showing a structure of the visual angle correcting protrusion shown in FIG. 9.

FIG. 9 is a perspective view showing a visual angle correcting protrusion formed on a light emitting surface of the light guide plate shown in FIG. 6, FIG. 10 is a cross-sectional view showing a structure of the visual angle correcting protrusion shown in FIG. 9.

Referring to FIGS. 9 and 10, the visual angle correcting portion 221 includes a plurality of visual angle correcting protrusions 221g formed on the light emitting surface 222f. The visual angle correcting protrusion 221g is protruded from the light emitting surface 222f to have a predetermined height h1. The predetermined height h1 of the visual angle correcting protrusion 221g is less than 0.5 mm. A volume of the visual angle correcting protrusion 221g is inversely proportional to the height of the visual angle correcting protrusion 221g. Namely, the visual angle correcting protrusion 221g can be any shape satisfying the condition that the volume of the visual angle correcting protrusion 221g decreases according as the predetermined height "h" increases. For example, the visual angle correcting protrusion 221g has a pyramid shape having at least three sidewalls. In one embodiment, the visual angle correcting protrusion 221g has a quadrangle shape having four sidewalls as shown in FIGS. 9 and 10.

The visual angle correcting protrusion 221g is arranged in a matrix form. The visual angle correcting protrusion 221g has a volume proportional to a distance between the light incident side surface 222b and the visual angle correcting protrusion 221g.

Hereinafter, a distribution of brightness changed by the visual angle correcting portion 221 will be described based on simulation experiments and results thereof.

The simulation conditions in the experiments are as follows. Referring to FIGS. 4 to 6, the lamp 210 has a diameter of about 2 mm and a brightness of about 30000 cd/m$^2$. The light guide plate 220 includes a first side surface 222b that receives the light from the lamp 210 and a second side surface 222d opposite the first side surface. The first side surface 222b has a dimension of 20×3 (mm) and the second side surface 222d has a dimension of 20×2 (mm). The light guide plate 220 is formed of polymethylmetacrylate (PMMA) having a refractive index of about 1.49. The light guide plate 220 includes the reflecting dot formed on the light reflecting surface 222e and the reflecting dot has a diameter of about 0.5 mm. As shown in FIG. 6, the brightness is measured at a visual angle of zero degree (front visual angle) corresponding to a direction perpendicular to the light guide plate 220 and at a visual angle of 90 degrees corresponding to a direction parallel to the light guide plate 220, and therebetween.

TABLE 1

| | Position of the visual angle correcting portion | Shape of the visual angle correcting portion | Size of the cell (mm) | Angle of the visual angle correcting portion (degrees) | Height or depth of the visual angle correcting portion (mm) | |
|---|---|---|---|---|---|---|
| Comparative example A | — | — | — | — | — | No reflecting dot |
| Comparative example B | — | — | — | — | — | |
| Example 1 | On upper surface of LGP | Protrusion | 1 × 1 | 45 | 0.3 × 0.5 | Using the reflecting dot having a size of 0.5 mm |
| Example 2 | On upper surface of LGP | Recession | 1 × 1 | 45 | 0.3 × 0.5 | |
| Example 3 | On upper surface of LGP | Recession | 1 × 1 | 60 | 0.3 × 0.5 | |
| Example 4 | On upper surface of LGP | Recession | 1 × 1 | 60 | 0.2 × 0.4 | |
| Example 5 | On upper surface of LGP | Recession | 0.5 × 1.73 | 60 | 0.3 × 0.5 | |

As shown Table 1, simulation experiments were performed for seven cases. In the comparative examples, an LGP on which the visual angle correcting portion is not formed was used. In Examples, LGPs having various forms of visual angle correction portions are used. The size of the cell indicates a size of the upper surface of the light guide plate 220 occupied by one unit cell of the visual angle correction portion 221. The cell has a square shape in Examples 1 to 4 and a rectangular shape in Example 5.

Figure 8C:
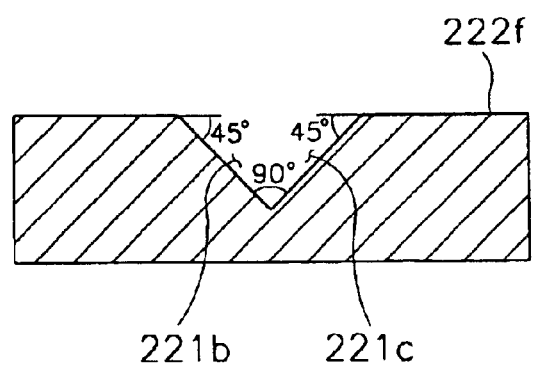
FIGS. 8C and 8D are cross-sectional views showing a detailed structure of the visual angle correcting recession shown in FIG. 7.
Figure 8D:
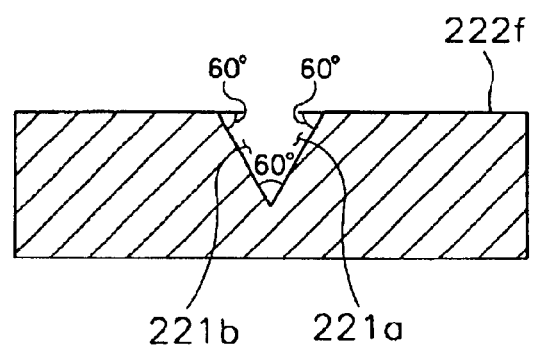

Referring to FIGS. 8C and 8D, the angle of the visual angle correcting portion 221 indicates an angle between the upper surface of the light guide plate 220 and the sidewalls of the visual angle correcting portion 221. Accordingly, where the angle is 45 degrees, an angle between two sidewalls at a bottom of the visual angle correcting portion 221 is 90 degrees. Where the angle is 60 degrees, the angle between two sidewalls at the bottom of the visual angle correcting portion 221 is 60 degrees as shown in FIG. 8.

Figure 11:
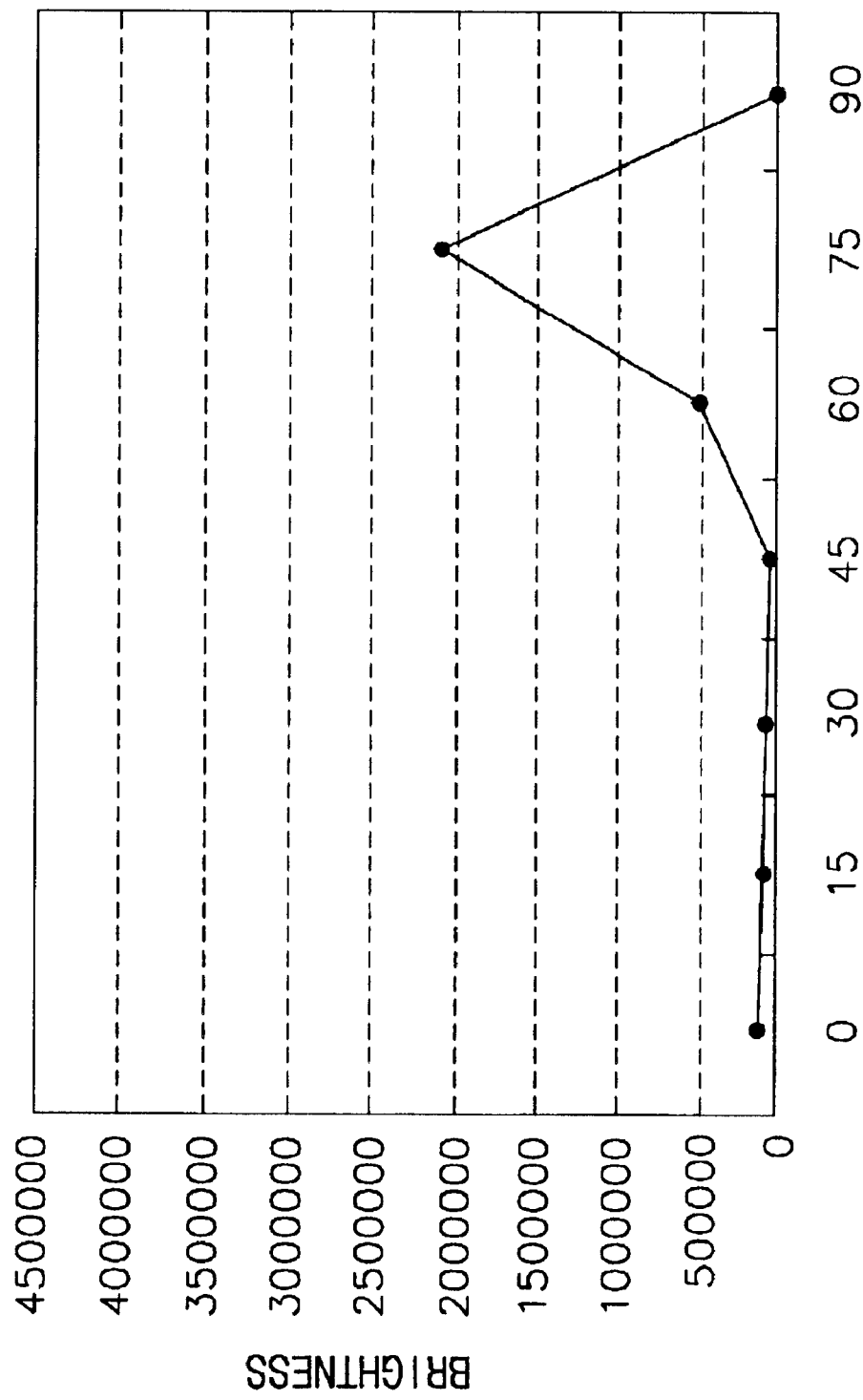
FIGS. 11 to 18 are graphs showing a distribution of brightness in accordance with a visual angle.

FIG. 11 is a graph showing a distribution of brightness in accordance with a visual angle in Comparative example A.

Figure 12:
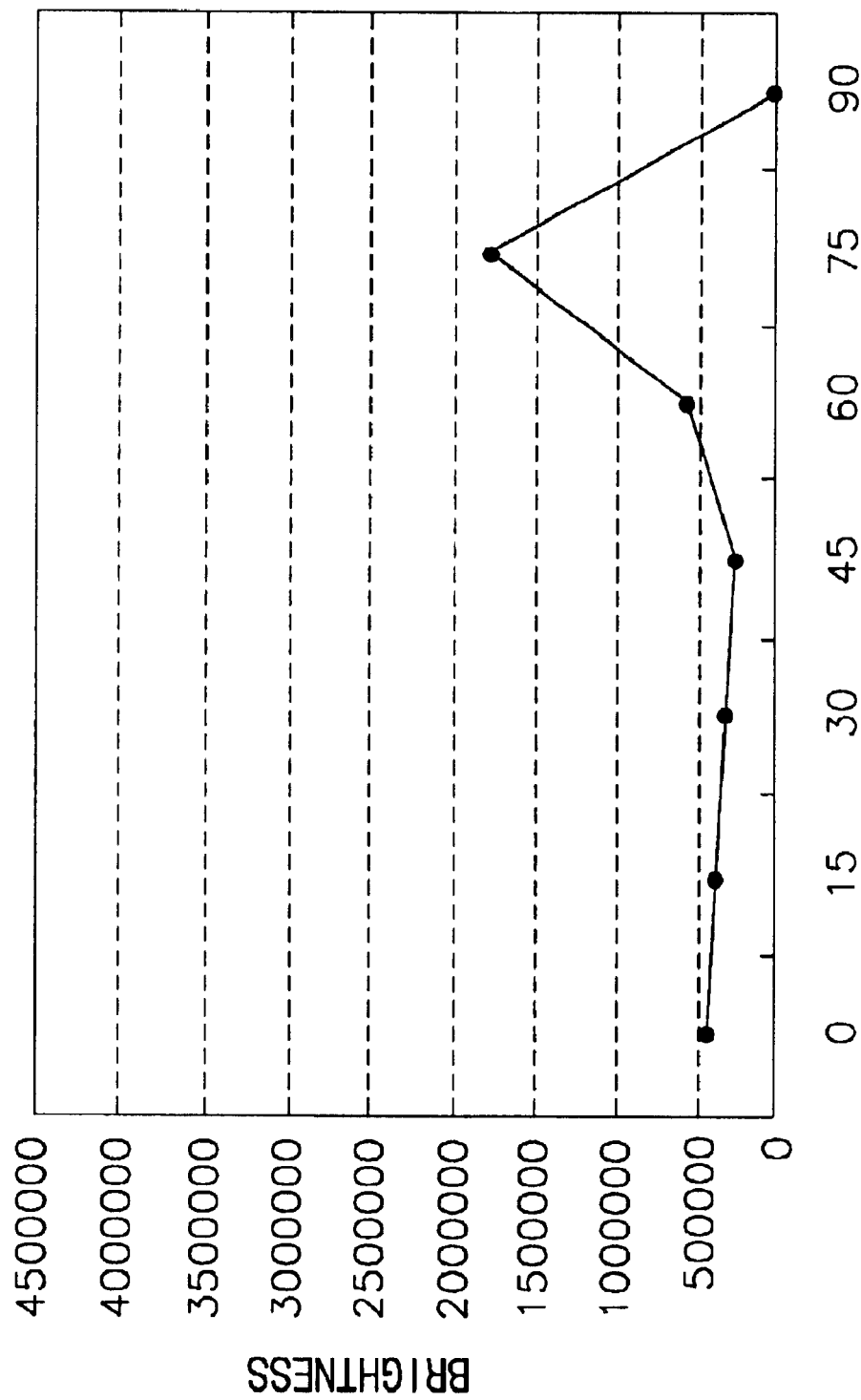

FIG. 12 is a graph showing a distribution of brightness in accordance with a visual angle in Comparative example B.

Referring to FIG. 11, the brightness is low at a visual angle of 0 to 45 degrees and abruptly increases at a visual angle over 45 degrees. In Comparative example A, the brightness distribution graph shows a peak value at a visual angle of 75 degrees.

Referring to FIG. 12, the brightness is low at a visual angle of 0 to 45 degrees and abruptly increases at a visual angle of over 45 degrees. In Comparative example A, the brightness distribution graph shows a peak value at a visual angle of 75 degrees. In the range of the visual angle of 0 to 45 degrees, the brightness distribution in Comparative example B is maintained at a higher value than that in Comparative example A. This is because the light guide plate has the reflecting dot on the light reflecting surface.

Figure 13:
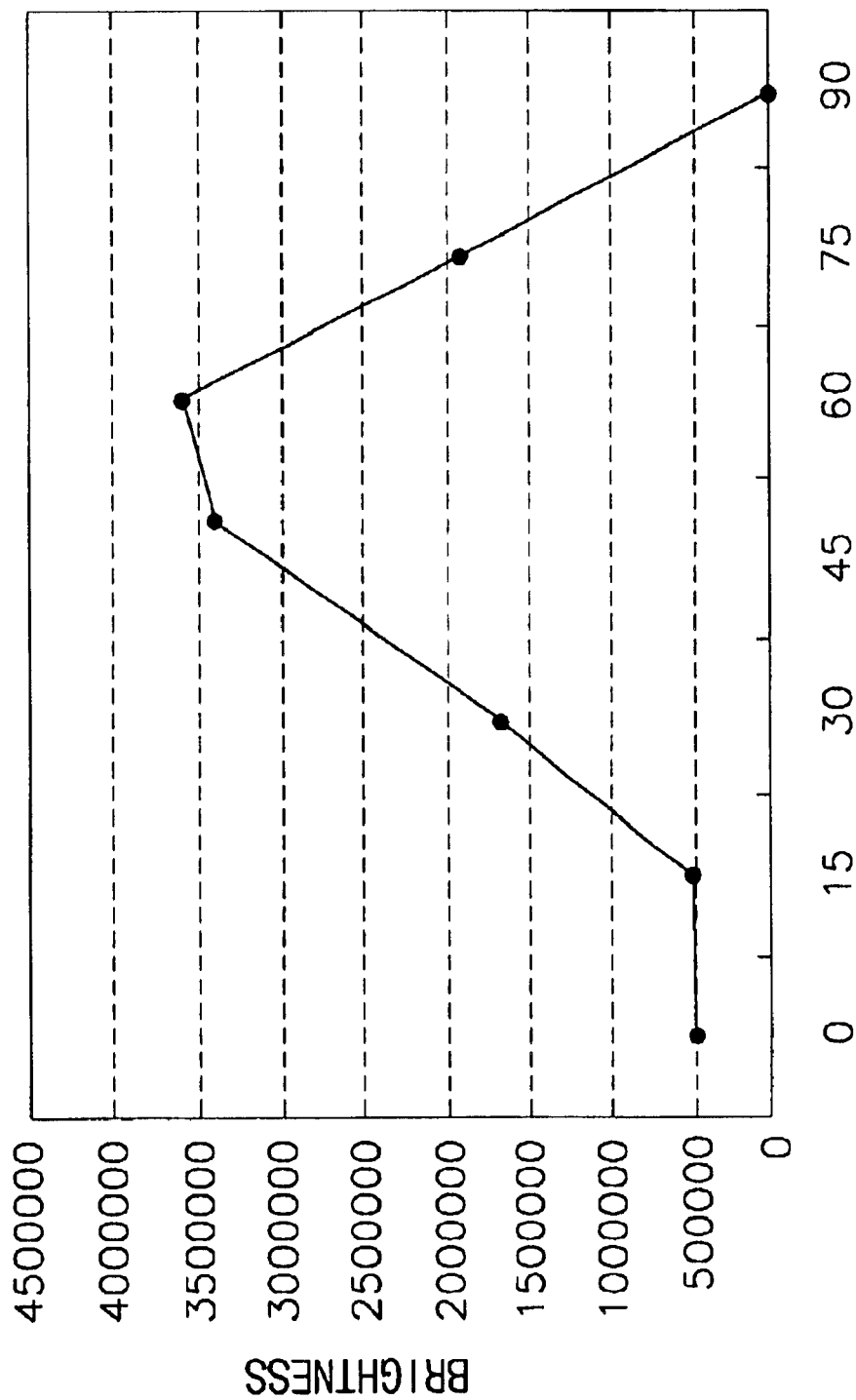
Figure 14:
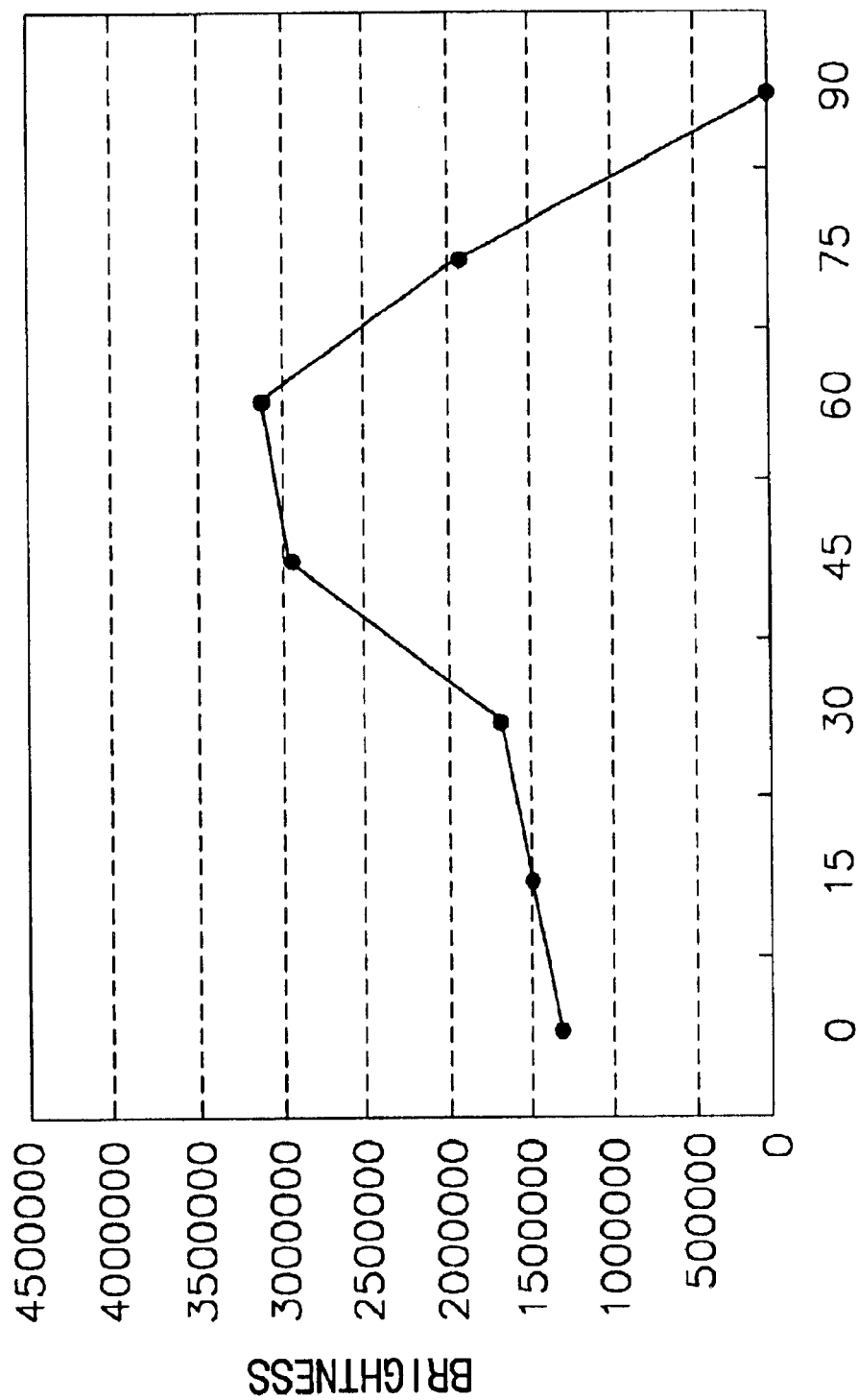

FIG. 13 is a graph showing a distribution of brightness in accordance with a visual angle in Example 1. FIG. 14 is a graph showing a distribution of brightness in accordance with a visual angle in Example 2.

Referring to FIG. 13, the brightness is low at a visual angle of 0 to 15 degrees and increases until the visual angle is 60 degrees. In Example 1, the brightness distribution has a peak value at 60 degrees of visual angle. The visual angle showing the peak value of the brightness in Example 1 is smaller than that in Comparative Examples A and B. This means that visual angle characteristics, particularly, front visual angle characteristics are improved in Example 1.

Referring to FIG. 14, the brightness distribution around the front visual angle increases and the brightness distribution graph has a peak value at a visual angle of 60 degrees in Example 2.

In Example 1, the light guide plate has the visual angle correcting portion in a protrusion form such as the visual angle correcting protrusion 221g as shown in FIG. 9. In Example 2, the light guide plate has the visual angle correcting portion in a recession form such as the visual angle correcting recession 221a as shown in FIG. 7. Both of Examples 1 and 2 show improved front visual angle characteristics compared with Comparative examples A and B. Particularly, the visual correcting portion having the recession form employed in Example 2 is better than the visual correcting portion having the protrusion form employed in Example 1 in enhancing the front visual angle characteristics. Where the protrusion form of the visual correction portion is formed on the light guide plate, a portion of the light is refracted towards the light reflecting surface 222e due to a refraction at a boundary surface between the visual angle correcting protrusion 221g and an air.

Figure 15:
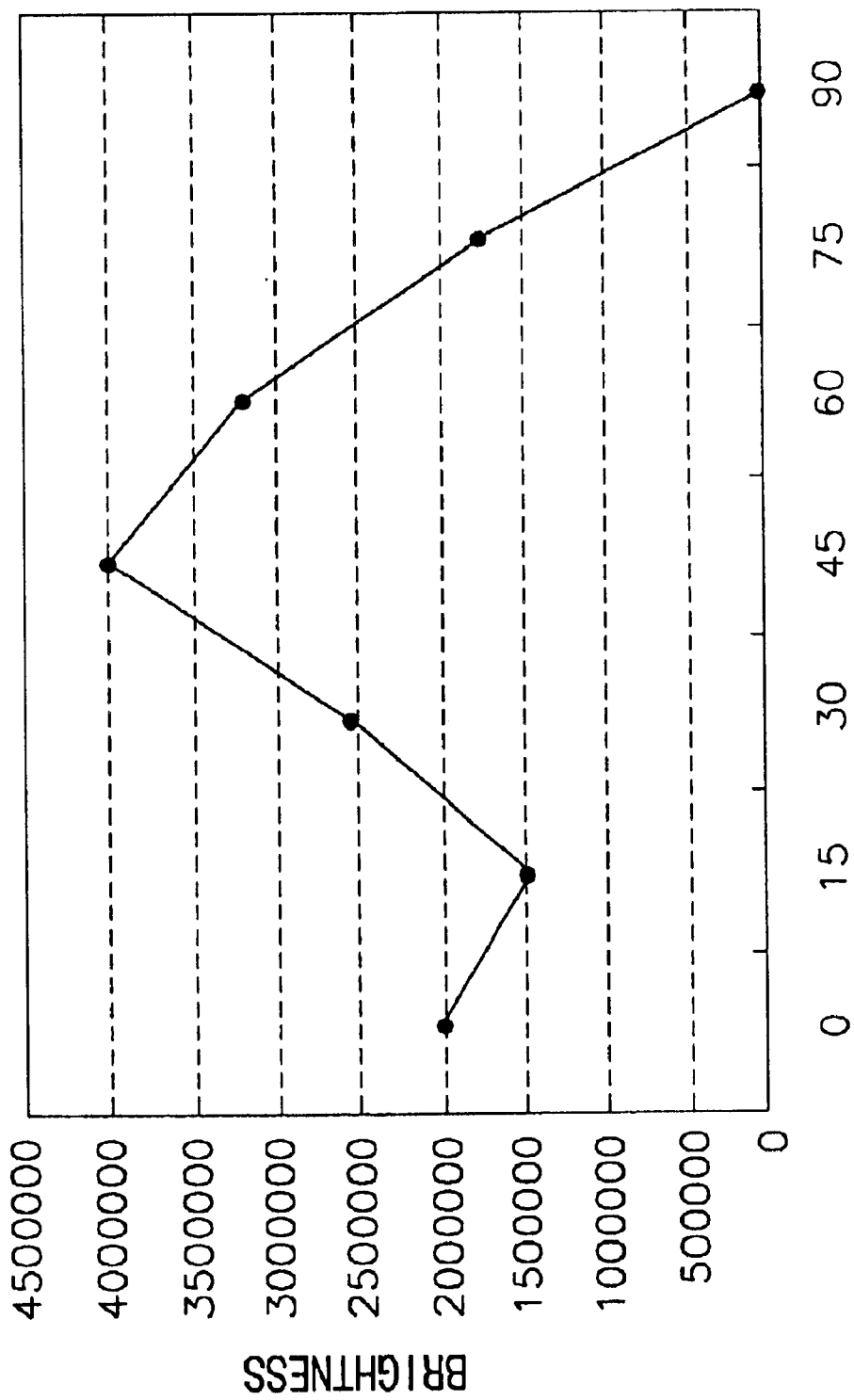
Figure 16:
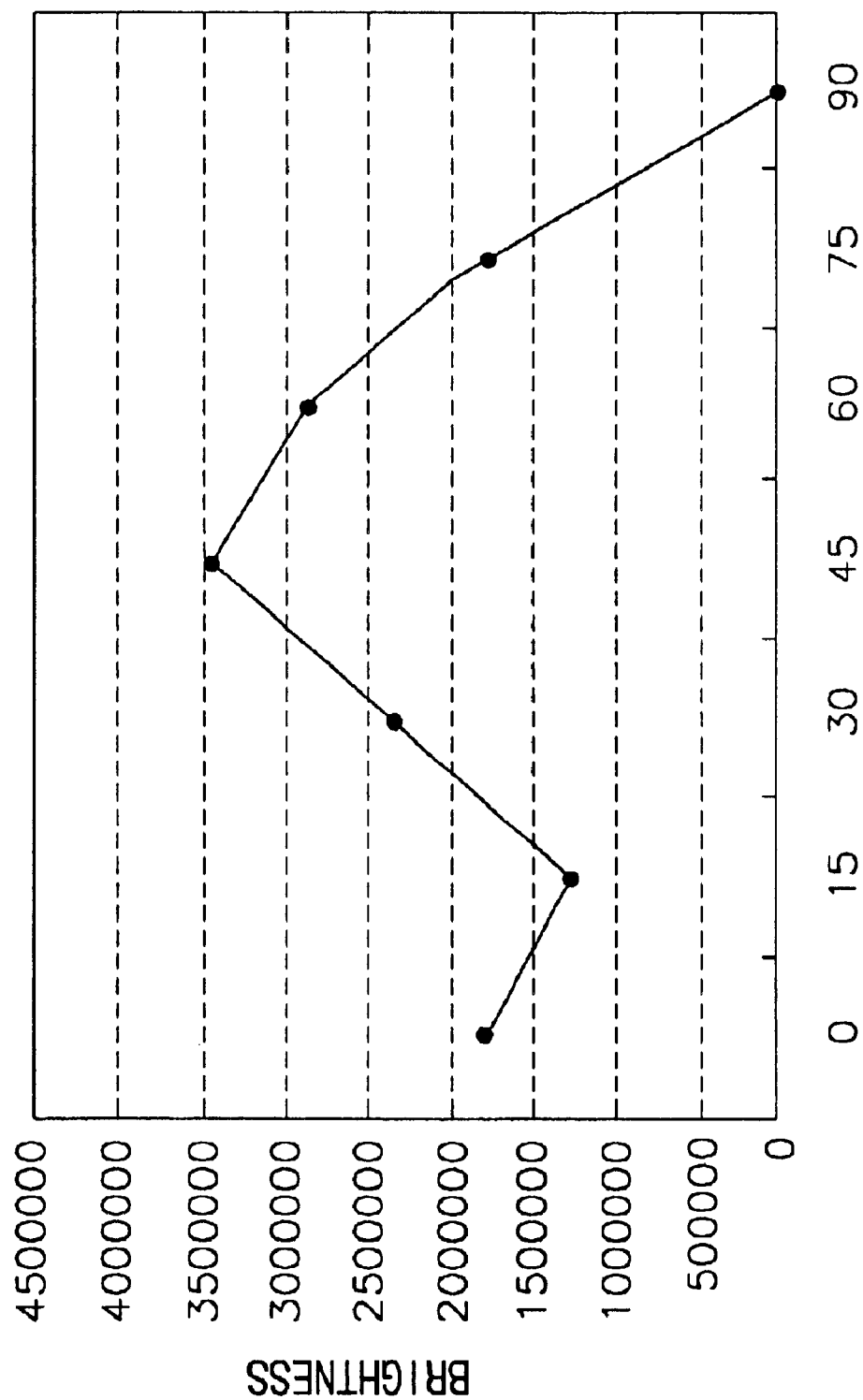
Figure 17:
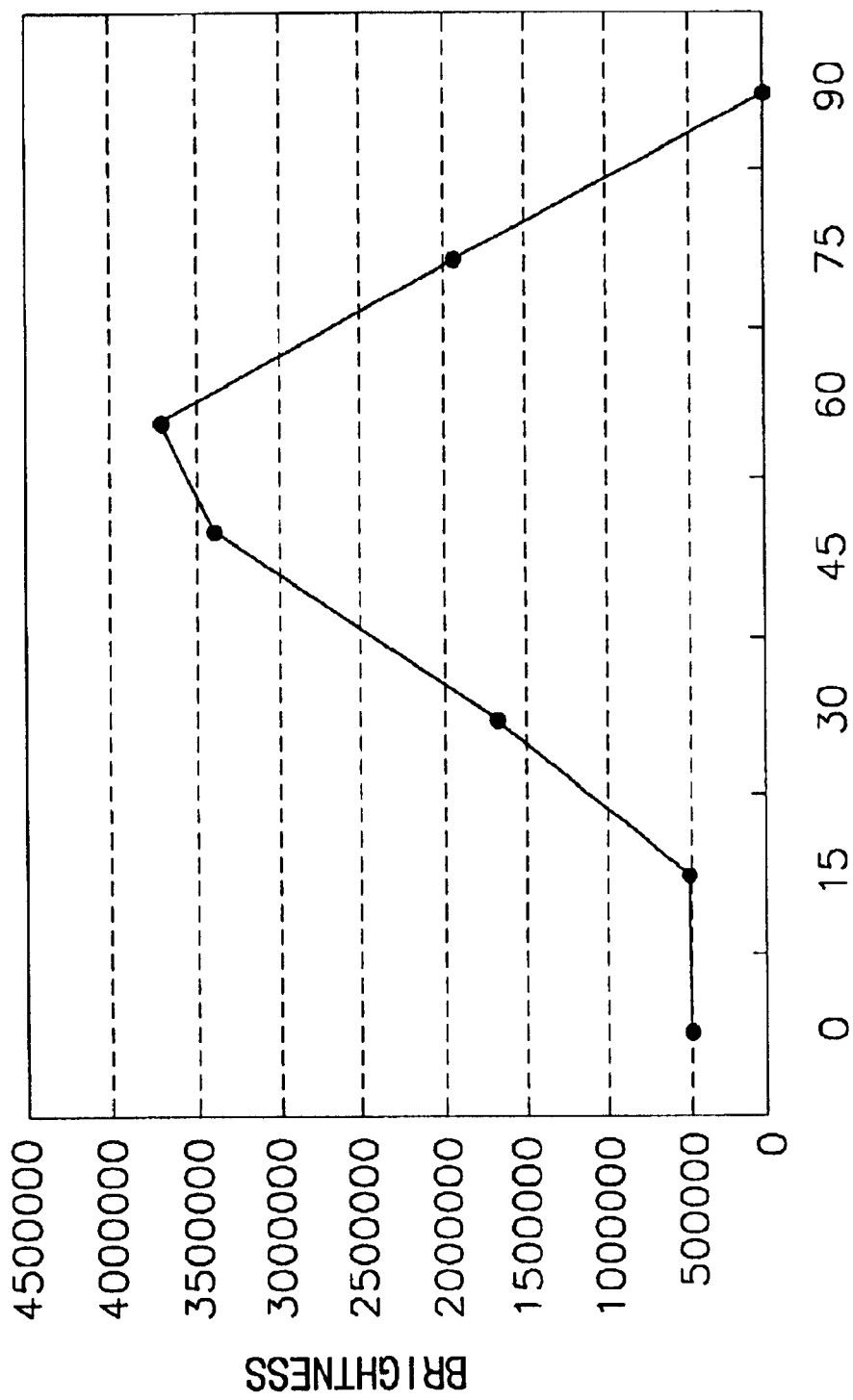

FIG. 15 is a graph showing a distribution of brightness in accordance with visual angle in Example 3. FIG. 16 is a graph showing a distribution of brightness in accordance with visual angle in Example 4. FIG. 17 is a graph showing a distribution of brightness in accordance with visual angle in Example 5.

Referring to FIG. 15, the front visual angle characteristics are greatly improved compared with Comparative Examples A and B. In Example 3, the brightness distribution graph has a peak value at a visual angle of 45 degrees. Therefore, the front visual angle characteristics are enhanced even compared with Example 2.

The visual angle correcting recession 221a of Example 4 has a depth shallower than that of Example 3. The brightness distribution pattern shown in FIG. 16 is similar to that shown in FIG. 15 except that the pattern in FIG. 16 generally shifts downward. The reason is believed that a volume of the visual angle correcting recession 221a of Example 4 is smaller than that of the visual angle correcting recession 221a of Example 3.

Example 5 was performed under the same condition as applied to Example 4 except the shape of the cell. The boundary lines between adjacent sidewalls of the visual angle correcting portion 221 and the upper surface of the light guide plate forms an equilateral triangle shape in Example 5, and forms an isosceles triangle shape in Example 4. Referring to FIGS. 16 and 17, the equilateral triangle shape gives an improved brightness distribution in aspects of the front visual angle characteristics.

Figure 18:
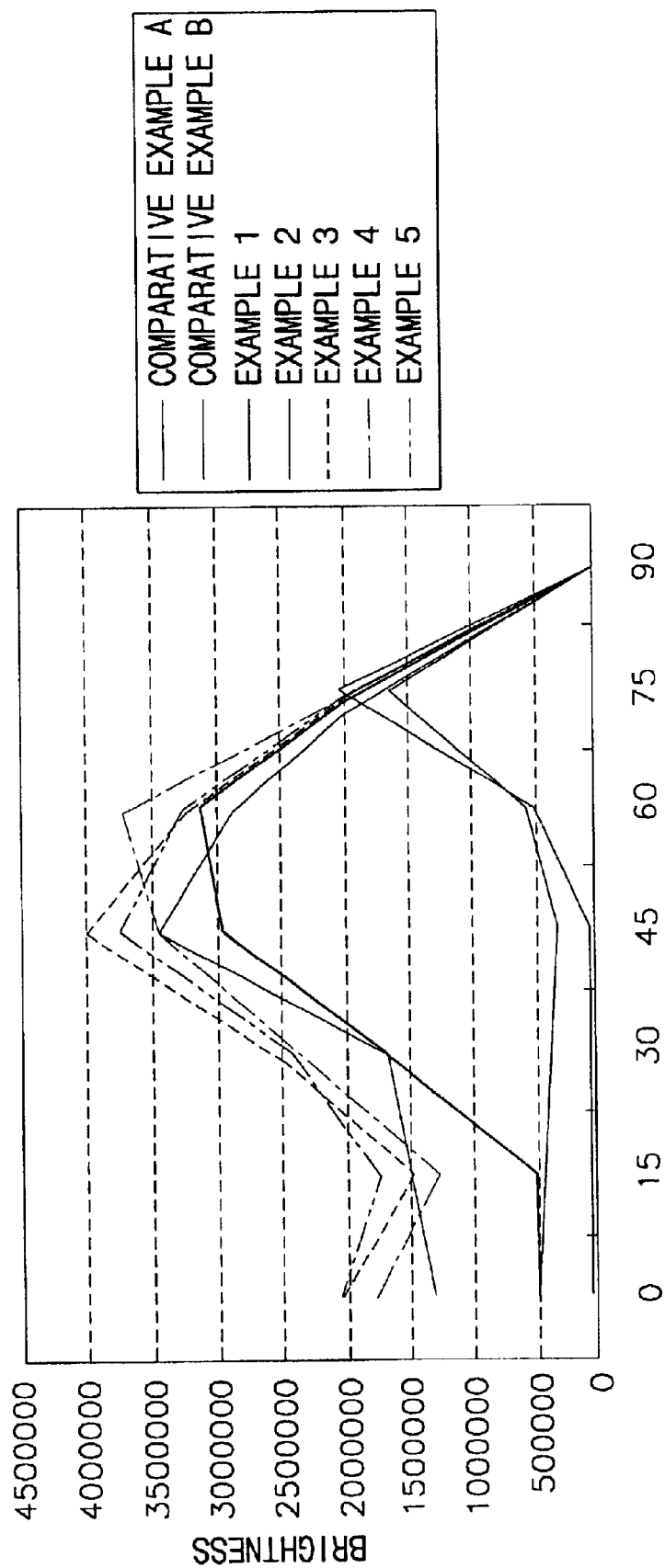

FIG. 18 shows brightness distribution for Comparative Examples A and B and Examples 1–5. From FIG. 18, in order to improve the brightness distribution in aspects of the front visual angle characteristics, the following factors are considered. The visual angle correcting portion having a recession form is more effective than that having a protrusion form. The angle between the sidewall of the visual angle correcting recession 221a and the light emitting surface 222f is maintained greater than a predetermined value. The volume of the visual angle correcting portion is maintained greater than a predetermined value. Namely, it is desirous that the volume of the visual angle correcting portion is high. Also, the shape of the sidewalls of the visual angle correcting portion is considered. The brightness distribution pattern is improved where the sidewalls have a same shape such as an equilateral triangle.

Figure 19:
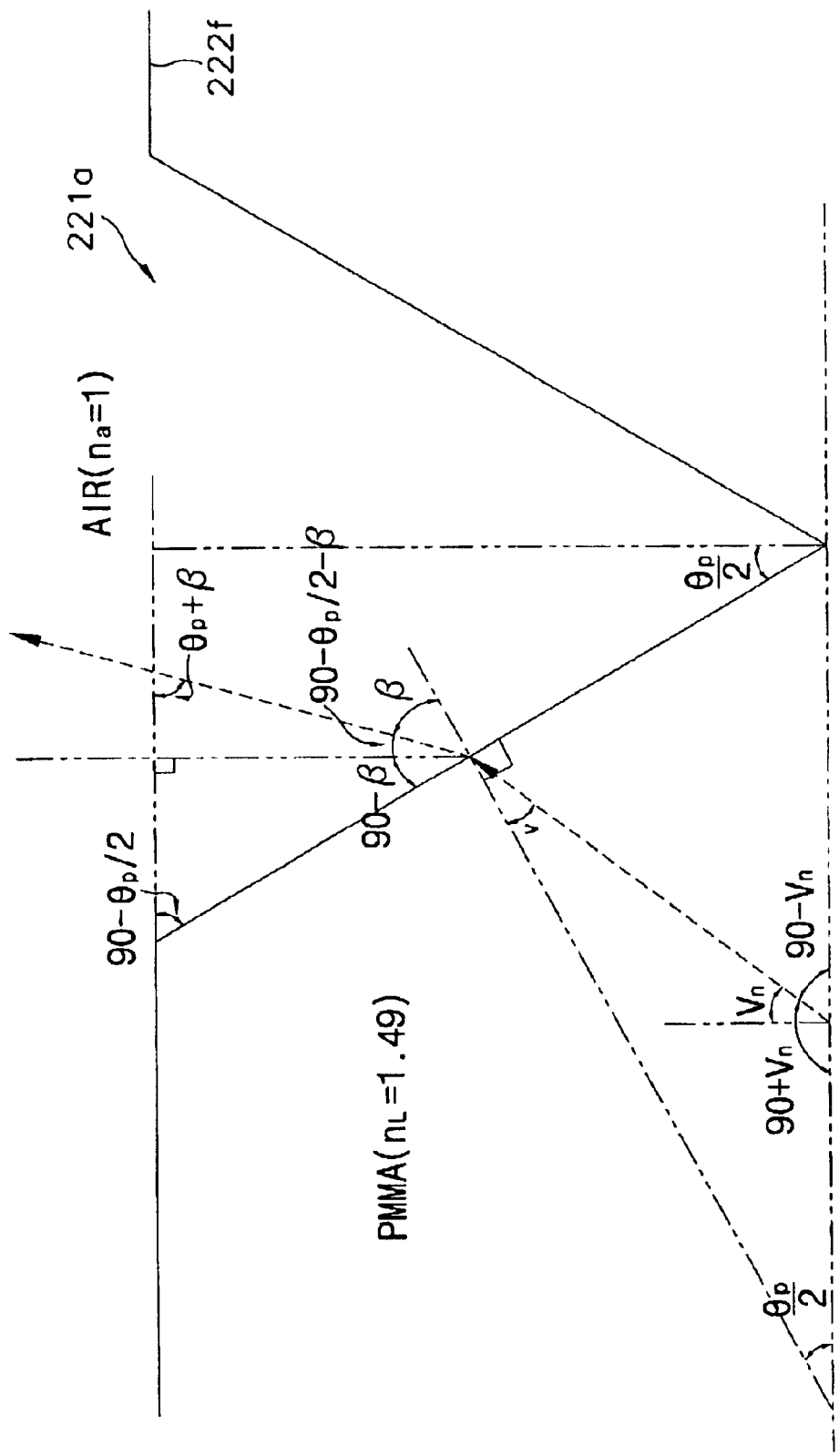
FIG. 19 is a schematic view showing a light path of the visual angle correcting recession according to one example of the present invention.

Hereinafter, a method for maximizing a brightness at the front visual angle will be described with reference to FIG. 19 and Equations 1 to 3.

In Equations 1 to 3, characters $\theta_p$, v, $\beta$ and $v_n$ indicate an internal angle of the visual angle correcting recession 221a, an incident angle between an incident path of the light incident onto the sidewall of the visual angle correcting recession 221a and a line perpendicular to the sidewall, an emission angle of the light with respect to the sidewall of the visual angle correcting recession 221a, and a normal incident angle with respect to the surface of the light guide plate 220, respectively.

The light guide plate 220 is generally made of PMMA having a refractive index of about 1.49. Ideally, the light is emitted in a direction perpendicular to the surface of the light guide plate 220. That is, ideally, $90 - \theta_p/2 - \beta = 0$. The angle $\theta_p$ is derived by the following Equations 1–3.

$$v = 180 - \theta_p/2 - 90 - v_n \quad \text{[Equation 1]}$$

In Equation 1, assuming that the refractive index of the light guide plate 220 is 1.49 and the refractive index of the air is 1, in order to assure that the light is not reflected from the sidewall of the visual angle correcting recession 221, the incident angle v is not more than 42.15 degrees (v≦42.15°) according to the principle of refraction. Assuming that $v_n$ is 42 degrees, the angle $\theta_p$ is not less than 5.85 degrees ($\theta_p \geq 5.85°$).

$$\sin \beta = n_p/n_a \sin(90 - \theta_p/2 - v_n) \quad \text{[Equation 2]}$$

From Equation 2 and Equation $90 - \theta_p/2 = \beta$, Equation 3 is derived as follows.

$$\sin(90 - \theta_p/2) = n_p \sin(90 - \theta_p/2 - v_n) \quad \text{[Equation 3]}$$
$$\cos(\theta_p/2) = n_p \cos(\theta_p/2 + v_n)$$

-continued $$\cos(\theta_p/2) = n_p(\cos\theta_p/2\cos v_n - \sin\theta_p/2\sin v_n)$$

$$1 = n_p(\cos v_n - \tan\theta_p/2\sin v_n)$$

$$\tan\theta_p/2 = n_p\cos v_n - 1/n_p \sin v_n$$

$$\theta_p = 6.125 \text{ degrees}$$

Where $v_n$ is 42 degrees, the angle $\theta_p$ is about 6 degrees. That is, where the angle $\theta_p$ is about 6 degrees, the brightness at the front visual angle is maximized. The visual angle correcting recession 221a of which $\theta_p$ is about 6 degrees is shown in FIG. 20.

Figure 20:
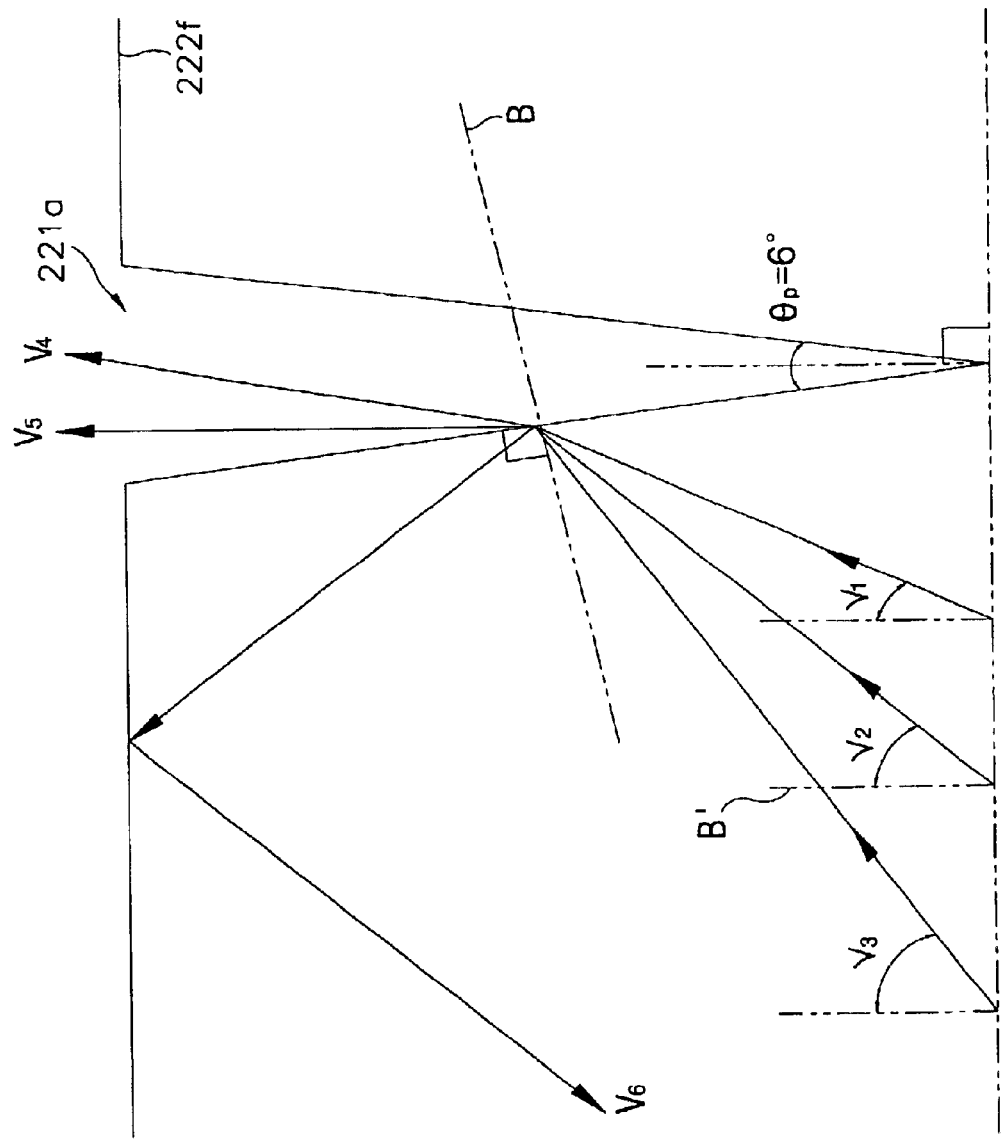
FIG. 20 is a schematic view showing a light path of an optimized visual angle correcting recession according to one example of the present invention.

FIG. 20 is a schematic view showing a light path of an optimized visual angle correcting recession according to one example of the present invention.

Referring to FIG. 20, where $v_n$ is 42 degrees, the emission angle of the light through the sidewall of the visual angle correcting recession 221a is substantially perpendicular to the LCD panel assembly as shown a light $V_5$. However, since a difference between the emission angle and a critical reflection angle that is the lowest angle enabling reflection is very small, the light that is incident with an angle over 42 degrees with respect to a normal line B of the sidewall of the visual angle correcting recession 221a is completely reflected as shown a light $V_6$. On the contrary, the light that is incident with an angle less than 42 degrees with respect to a normal line B is inclined with respect to a normal line B' with respect to the surface of the light guide plate 220 as shown a light $V_4$. That is, the visual angle of the light emitted through the visual angle correcting recession 221a becomes greater with respect to the normal line B' as the incident angle becomes smaller.

Since most of light emitted through the light guide plate without the visual angle correcting portion 221 has an angle within the range of about 75–83 degrees with respect to the surface of the light guide plate, the normal incident angle $v_n$ having 42 degrees is decided as a normal angle. Also, when calculating the normal incident angle $v_n$ for emitting the light having the angle within the range of about 75–83 degrees with respect to the surface of the light guide plate with the aforementioned equations, the normal incident angle $v_n$ becomes 42 degrees. Thus, the normal incident angle $v_n$ having 42 degrees with respect to the normal line B is used as the normal angle for obtaining the front visual angle.

Figure 21:
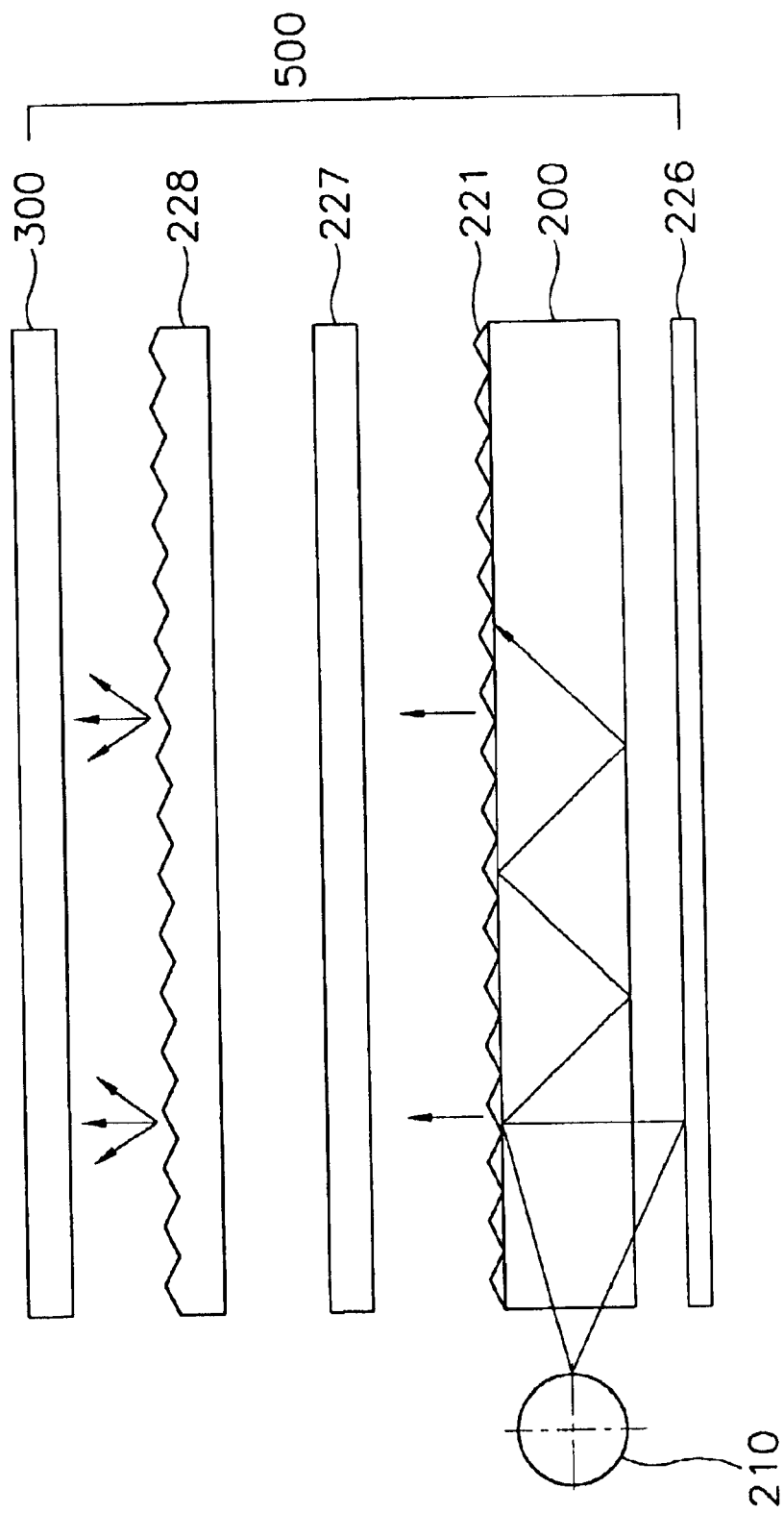
FIG. 21 is a schematic view showing a thin type LCD apparatus according to one example of the present invention.

The LCD apparatus that adopts the light guide plate 220 having the visual angle correcting recession 221a having the internal angle of 6 degrees can be used as the sheetless LCD apparatus as shown in FIG. 4.

Where the internal angle is greater than 6 degrees, a diffusion sheet and/or a prism sheet are included in an LCD apparatus. FIG. 21 shows an LCD apparatus according to one example of the present invention. The LCD apparatus 500 includes the diffusion sheet 227 and the prism sheet 228 to prevent the brightness of the front visual angle from being reduced due to an increase of the internal angle of the visual angle correcting recession 221a. The number of prism sheets included in the LCD can be reduced compared with conventional LCD. However, display quality of the LCD of the present invention is substantially the same as that of the conventional LCD including more prism sheets. A reference numeral "226" indicates a reflecting plate disposed under the light guide plate 220 and the reflecting plate 226 reflects the light leaked from the light guide plate 220 towards the light guide plate 200.

The sheetless LCD apparatus 400 and thin type LCD apparatus 500 can increase the brightness of the front visual angle without using the prism and diffusion sheets or with a reduced number of the prism sheets.

Accordingly, the sheetless LCD apparatus 400 and the thin type LCD apparatus 500 have advantages compared with the conventional LCD apparatus in aspects of overall weight, volume and manufacturing cost.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A light guide plate comprising:
   a side portion that receives a light;
   a light reflecting portion that reflects the light input through the side portion; and
   a light emitting portion that faces the light reflecting portion and emits the light reflected by the light reflecting portion,
   wherein the light emitting portion has visual angle adjusting members to increase a brightness of the light emitted through the light emitting portion at a front visual angle, volumes of the visual angle adjusting members being inversely proportional to heights of the visual angle adjusting members.

2. The light guide plate of claim 1, wherein the visual angle adjusting members include visual angle adjusting recessions recessed from the light emitting portion.

3. The light guide plate of claim 2, wherein each of the visual angle adjusting recessions has a pyramid shape.

4. The light guide plate of claim 3, wherein the pyramid shape has a polygonal base having a square shape.

5. The light guide plate of claim 3, wherein the pyramid shape has triangular faces, and each of the triangular faces has an equilateral triangle shape.

6. The light guide plate of claim 3, wherein the pyramid shape has triangular faces, and each of the triangular faces has an isosceles triangle shape.

7. The light guide plate of claim 2, wherein each of the visual angle adjusting recessions has a height less than 0.5 mm.

8. The light guide plate of claim 2, wherein the visual angle adjusting recessions are arranged in a matrix form.

9. The light guide plate of claim 8, wherein the visual angle adjusting recessions have volumes proportional to distances between the side portion and the visual angle adjusting recessions.

10. The light guide plate of claim 2, wherein the light guide plate has a refractive index of about 1.49 and a vertex of each of the visual angle adjusting recessions has an internal angle of about 6 to 60 degrees.

11. The light guide plate of claim 2, wherein the light guide plate has a refractive index of about 1.49 and a vertex of each of the visual angle adjusting recessions has an internal angle of about 31 to 60 degrees.

12. The light guide plate of claim 1, wherein the visual angle adjusting members include visual angle adjusting protrusions protruded from the light emitting portion.

13. The light guide plate of claim 12, wherein each of the visual angle adjusting protrusions has a pyramid shape.

14. The light guide plate of claim 13, wherein the pyramid shape has a polygonal base having a square shape.

15. The light guide of claim 12, wherein each of the visual angle adjusting protrusions has a height less than 0.5 mm.

16. The light guide plate of claim 12, wherein the visual angle adjusting protrusions are arranged in a matrix form.

17. The light guide plate of claim 16, wherein the visual angle adjusting protrusions have volumes proportional to distances between the side portion and the visual angle adjusting protrusions.

18. The light guide plate of claim 12, wherein the light guide plate has a refractive index of about 1.49 and a vertex of each of the visual angle adjusting protrusions has an internal angle of about 6 to 60 degrees.

19. The light guide plate of claim 12, wherein the light guide plate has a refractive index of about 1.49 and a vertex of each of the visual angle adjusting protrusions has an internal angle of about 31 to 60 degrees.

20. The light guide plate of claim 1, wherein the light reflecting portion comprises a reflecting member.

21. The light guide plate of claim 20, wherein the reflecting member comprises a light scattering material and is disposed on the light reflecting portion in a matrix form, and an surface area of reflecting member is proportional to a distance between the side portion and the reflecting member.

22. An LCD apparatus comprising:
an LCD panel assembly that controls a liquid crystal to display an image; and
a backlight assembly having a lamp assembly that supplies a light and a light guide plate that guides the light from the lamp assembly to the LCD panel assembly,
wherein the light guide plate comprises a side portion that receives the light, a light reflecting portion that reflects the light input through the side portion, and a light emitting portion that faces the light reflecting portion and emits the light reflected by the light reflecting portion, the light emitting portion including visual angle adjusting members that increasing a brightness of the light emitted through the light emitting portion at a front visual angle, volumes of the visual angle adjusting members being inversely proportional to heights of the visual angle adjusting members.

23. The LCD apparatus of claim 22, wherein the visual angle adjusting members includes visual angle adjusting recessions recessed from the light emitting portion; and
wherein the light guide plate has a refractive index of about 1.49 and each of the visual angle adjusting recessions has a vertex having an internal angle of about 6 to 30 degrees.

24. The LCD apparatus of claim 22, wherein the visual angle adjusting members include visual angle adjusting protrusions protruded from the light emitting portion; and
wherein the light guide plate has a refractive index of about 1.49 and each of the visual angle adjusting protrusion has a vertex having an internal angle of about 6 to 30 degrees.

25. The LCD apparatus of claim 22, wherein each of the visual angle adjusting members includes a pyramid shape that has polygonal base and triangular faces that meet at a common point.

26. An LCD apparatus comprising:
an LCD panel assembly that controls a liquid crystal to display an image; and
a backlight assembly having a lamp assembly that supplies a light, a light guide plate that guides the light from the lamp assembly to the LCD panel assembly and a prism sheet disposed between the LCD panel and the light guide plate,
wherein the light guide plate comprises a side portion that receives the light, a light reflecting portion that reflects the light input through the side portion, and a light emitting portion faces the light reflecting portion and emits the light reflected by the light reflecting portion, the light emitting portion including a visual angle adjusting members that increases a brightness of the light emitted through the light emitting portion at a front visual angle, volumes of the visual angle adjusting members being inversely proportional to height of the visual angle adjusting members.

27. The LCD apparatus of claim 26, further comprising:
a diffusing sheet that is disposed between the light guide plate and the prism sheet and changes the visual angle of the light emitted from the light emitting portion; and
a reflecting sheet that is disposed under the light reflecting portion and reflects the light leaked from the light guide plate to the light guide plate.

28. The LCD apparatus of claim 26, wherein the visual angle adjusting members include visual angle adjusting recessions recessed from the light emitting portion; and
wherein the light giude plate has a refractive index of about 1.49 and each of the visual angle adjusting recessions has vertex having an internal angle of about 31 to 60 degrees.

29. The LCD apparatus of claim 26, wherein the visual angle adjusting members include visual angle adjusting protrusions protruded from the light emitting portion; and
wherein the light guide plate has a refractive index of about 1.49 and each of the visual angle adjusting protrusions has a vertex having an internal angle of about 31 to 60 degrees.

30. The LCD apparatus of claim 26, wherein each of the visual angle adjusting members includes a pyramid shape that has a polygonal base and triangular faces that meet at a common point.

31. A light guide plate comprising:
a side portion that receives a light;
a light reflecting portion that reflects the light input through the side portion; and
a light emitting portion that faces the light reflecting portion, the light emitting portion emitting the light reflected by the light reflecting portion, and the light emitting portion having a visual angle adjusting recession having a pyramid shape that has a polygonal base and triangular faces that meet at a common point,
wherein the light guide plate has a refractive index of about 1.49 and a vertex of the visual angle adjusting recession has an internal angle of about 31 to 60 degrees.

32. A light guide plate of comprising:
a side portion that receives a light;
a light reflecting portion that reflects the light input through the side portion; and
a light emitting portion that faces the light reflecting portion, the light emitting portion emitting the light reflected by the light reflecting portion, and the light emitting portion having a visual angle adjusting recession having a pyramid shape that has a polygonal base and triangular faces that meet at a common point,
wherein the light guide plate has a refractive index of about 1.49 and a vertex of the visual angle adjusting recession has an internal angel of about 6 to 60 degrees.

* * * * *